(12) United States Patent
Zhang et al.

(10) Patent No.: US 7,797,075 B1
(45) Date of Patent: Sep. 14, 2010

(54) VACUUM-ASSISTED RESIN TRANSFER MOLDING FLOW-TRACKING PROCESS AND SYSTEM

(75) Inventors: Chun Zhang, Tallahassee, FL (US);
Zhiyong Liang, Tallahasee, FL (US);
Hsu-Pin Wang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 380 days.

(21) Appl. No.: 11/971,357

(22) Filed: Jan. 9, 2008

Related U.S. Application Data

(60) Provisional application No. 60/884,058, filed on Jan. 9, 2007.

(51) Int. Cl.
| | |
|---|---|
| *B29C 45/00* | (2006.01) |
| *G06F 19/00* | (2006.01) |
| *G06G 7/48* | (2006.01) |
| *B29C 45/76* | (2006.01) |

(52) U.S. Cl. .......................... 700/200; 700/204; 703/9; 264/40.1

(58) Field of Classification Search ................. 700/200, 700/204; 703/9; 264/40.1
See application file for complete search history.

(56) References Cited

U.S. PATENT DOCUMENTS

| | | | | |
|---|---|---|---|---|
| 5,940,309 | A | * 8/1999 | White et al. | 703/7 |
| 2004/0132878 | A1 | * 7/2004 | Sato | 524/183 |

OTHER PUBLICATIONS

Li et al. "Statistical Characterization and Robust Design of RTM Processes". Composites: Part A 36 (2005): 564-580.*

* cited by examiner

*Primary Examiner*—Ryan A Jarrett
(74) *Attorney, Agent, or Firm*—Allen, Dyer, Doppelt, Milbrath & Gilchrist, P.A.

(57) ABSTRACT

A method of optimizing a flow process in resin transfer molding can include the steps of pre-infusing a vacuum-assisted resin transfer mold with a liquid. A sequence of the mold pre-infusion step is detected, from which a flow inhomogeneity adjacent the auxiliary infusion gate is determined. Such a flow inhomogeneity can include, for example, a region where air bubbles can collect, leaving a dry spot in the mold that is not adequately reached by flowing liquid or resin. A resin infusion sequence can then be created, including an opening of the auxiliary infusion gate following a passage of resin therepast to prevent the formation of dry spots.

20 Claims, 13 Drawing Sheets

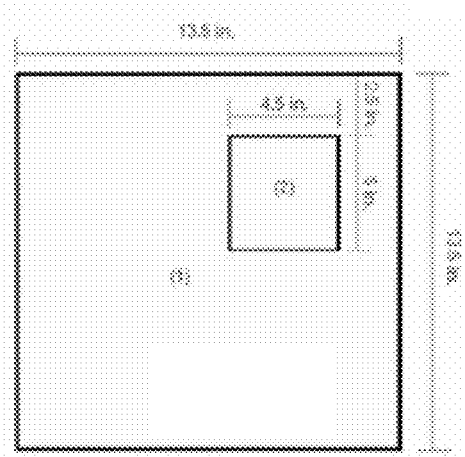
FIG. 6A
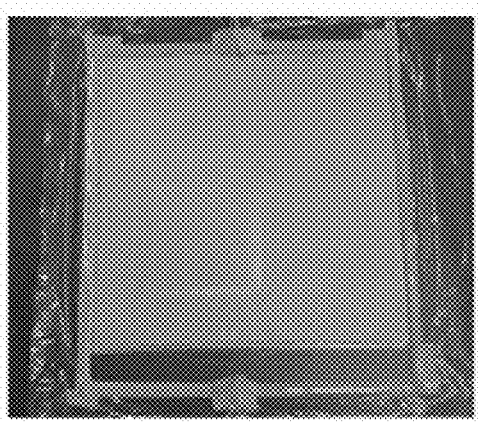
FIG. 6B
FIG. 7A  FIG. 7B  FIG. 7C  FIG. 7D  FIG. 7E
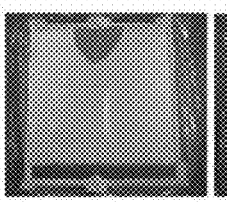 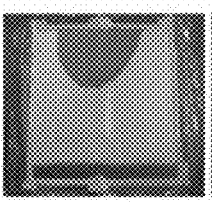 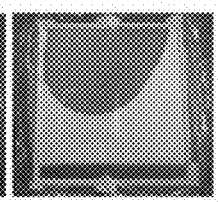 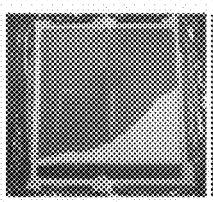 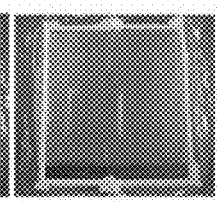
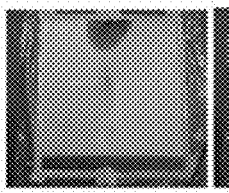 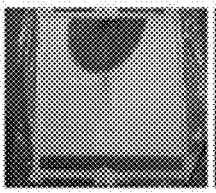 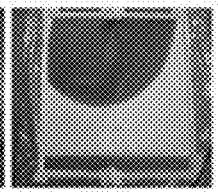 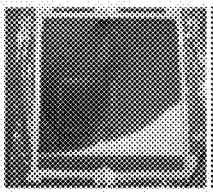 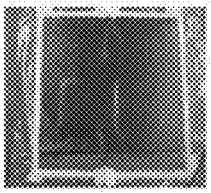
FIG. 7F  FIG. 7G  FIG. 7H  FIG. 7I  FIG. 7J
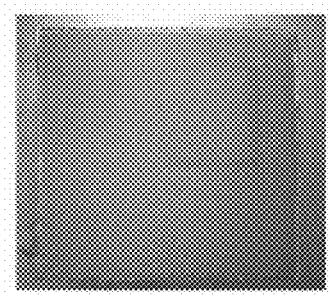 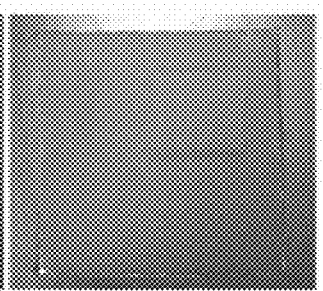
FIG. 8A   FIG. 8B

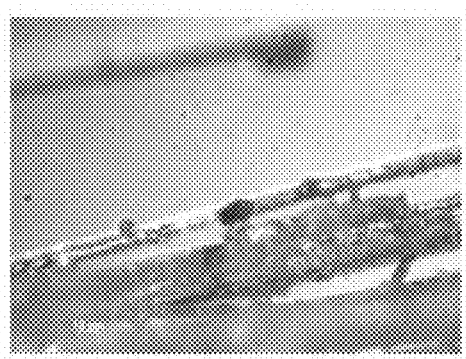
FIG. 15A
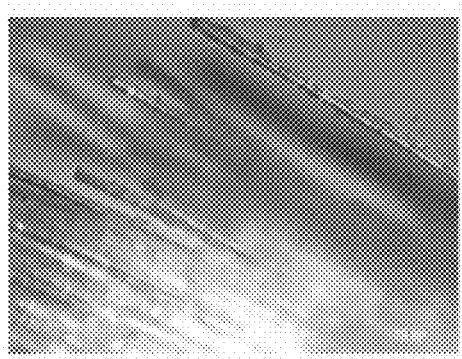
FIG. 15B
FIG. 16A
FIG. 16C
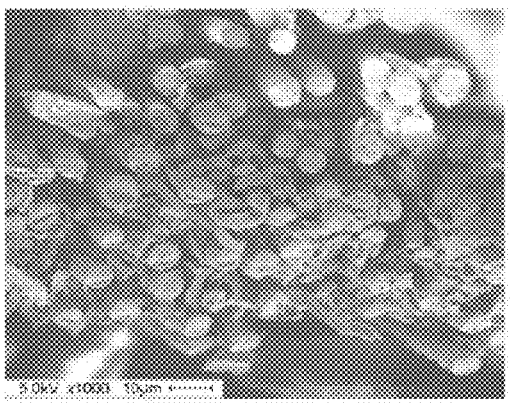
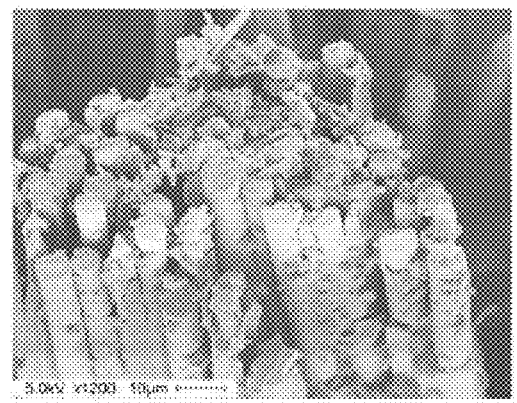
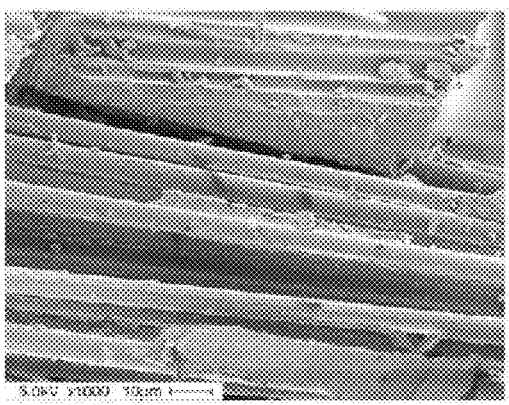
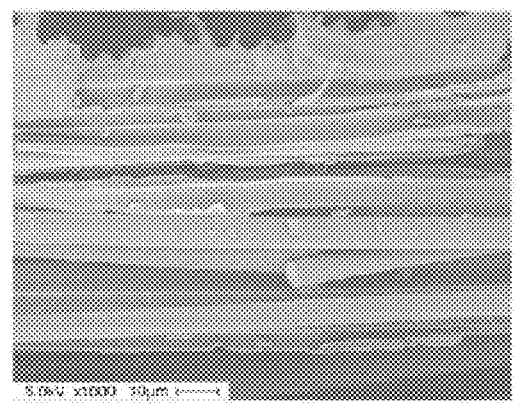
FIG. 16B
FIG. 16D

VACUUM-ASSISTED RESIN TRANSFER MOLDING FLOW-TRACKING PROCESS AND SYSTEM

CROSS-REFERENCE TO RELATED APPLICATION

This application claims priority to provisional application Ser. No. 60/884,058, filed on Jan. 9, 2007.

BACKGROUND OF THE INVENTION

Field of the Invention

Vacuum-assisted resin transfer molding (VARTM) is a widely used composite manufacturing process in which a polymer resin is infused into a mold containing a fiber preform and enclosed in a vacuum bag. Among the known processes for manufacturing composites, VARTM has received attention because it allows control of the resin content and is cost-effective to produce large and complex components.

In VARTM, the mold-filling process is critical to ensure high-quality production. Since the final mechanical properties are mainly dependent on the impregnation of the preform before the curing reaction, some experimental and numerical studies have been published to simulate the flow process. The VARTM process differs from conventional resin transfer molding (RTM) in that the thickness of the preform varies during infusion due to time-dependent permeability and compressibility. This difference makes the VARTM process more complex to simulate or control. Another concern is that the nominal permeability values may be known under ideal conditions, but the uncertainty in preform pore structure under pressure leads to a non-uniformity in the preform permeability. Thus there exist case-by-case permeability uncertainty and spatial permeability variability. As a result, numerical models can only roughly determine the optimized locations of inlets and vents by minimizing filling time.

To achieve adequate fiber wet-out and eliminate the occurrence of dry spots and voids, additional research by the inventors has combined filling process simulation with online real-time control of the actual manufacturing processes, including model-based and fuzzy logic theory have been applied to estimate online permeability, and a control approach of changing resin inlet locations to optimize the filling process has been presented. Real-time flow sensing was used to determine the optimum time to activate the second resin inlet. A vacuum-controlled VARTM test bed has been developed with a SMARTWeave flow sensing, and a scheme of using induction heating as a method of locally reducing the resin viscosity to counteract the effects of such localized low permeability regions within the preform has been tested. These on-line strategies with in situ sensor data did drive the process towards successful completion by taking corrective actions to eliminate voids. However, the common problem is that a large number of the sensors are required to be placed inside the mold to identify the in situ variability, which makes the real manufacturing process overly complicated.

In previous work conducted by the inventors, an in situ, gas-assisted permeability measurement method (GRASP) was developed that can measure the whole-field permeability of fiber preform before resin injection. However, GRASP requires a relatively large number of pressure sensors attached to the mold surfaces, which limits its applications. Substantive experiments of composites properties have been conducted to investigate the effect of the test liquid. The flow patterns for the test liquid and resin were found to be very similar, which suggested that the test liquid could successfully predict potential problems in the actual manufacturing process. The tests showed that relatively slight impact on the fiber-resin interface existed, which can be neglected. The mechanical testing results indicated that the mechanical, thermal, and microstructure properties of the test liquid pre-infused composite parts have no significant differences compared with those without the test liquid pre-infusion. Therefore, it would be desirable to be able to predict the flow pattern with a removable test liquid, wherein the test liquid can detect the locations where defects might occur, and wherein the control action is provided according to the results of the pre-infusion.

SUMMARY OF THE INVENTION

The present invention is directed to a method of tracking a flow process in vacuum-assisted resin transfer molding, so that an optimal infusion sequence can be determined. The method can comprise the steps of pre-infusing a vacuum-assisted resin transfer mold with a liquid. The mold has positioned therein an auxiliary infusion gate. A sequence of the mold pre-infusion step is detected, from which a flow inhomogeneity adjacent the auxiliary infusion gate can be determined. A resin infusion sequence can then be created, including an opening of the auxiliary infusion gate following a passage of resin therepast.

Thus the present invention proposes a control approach that requires neither data acquisition nor simulation tools. The test liquid is infused before the actual resin infusion such that the flow defect can be detected and control efforts can be provided accordingly. This method is simpler and more practical than known online control methods using sensors, and is capable of manipulating a real-time flow control to achieve complete preform saturation and void-free fill.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

FIGS. 6A,6B illustrate a 1M7 carbon fiber having a sector of three layers (1) and a sector of six layers (2) (FIG. 6A) and a vacuum bag assembly (FIG. 6B) for Case 2.

FIGS. 7A-7J illustrate the VARTM flow pattern for Case 2. Step 1 (FIGS. 7A-7F): alcohol flow; Step 2 (FIGS. 7G-7J): polyester flow after removal of alcohol.

FIGS. 8A,8B illustrate composite panels for Case 2 with alcohol pre-infusion (FIG. 8A) and without resin infusion (FIG. 8B).

FIGS. 15A,15B are optical micrographs (×10 μm) of the fracture surface of composite specimens with (FIG. 15A) and without (FIG. 15B) alcohol pre-infusion.

FIGS. 16A-16D are scanning electron micrographs (×10 μm) of two composite samples with (FIGS. 16A,16C) and without (FIGS. 16B,16D) alcohol pre-infusion.

DETAILED DESCRIPTION OF THE PREFERRED EMBODIMENTS

Figure 1:
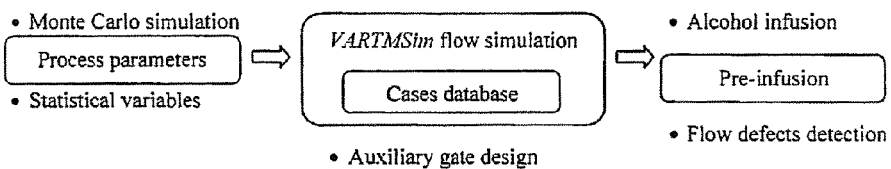
FIG. 1 is a flowchart of a method of alcohol-based process control for a VARTM scheme.
Figure 2:
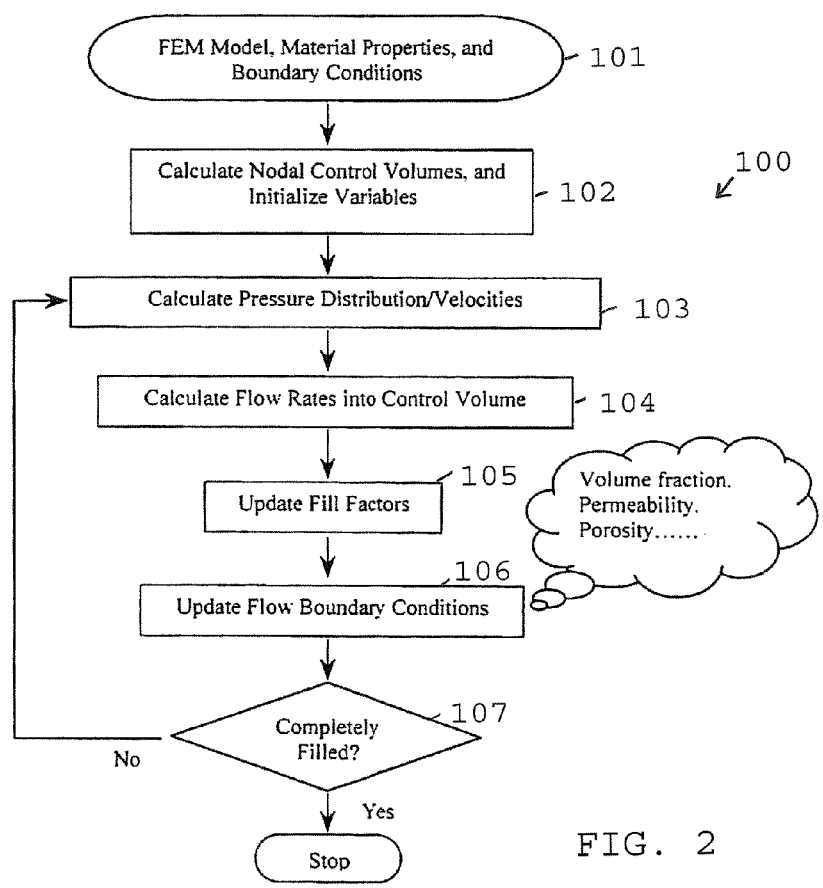
FIG. 2 is a flowchart for VARTM simulation.

A description of preferred embodiments of the present invention will now be presented with reference to FIGS. 1-26F.

In the VARTM process addressed in the present invention, a feature that can be utilized for process control is that the flow front can be obtained directly, which eliminates the need for flow detection sensors. In addition, the preform permeability possesses certain statistical properties that have a potential for flow process control. Here a case database is constructed by exploring most possible flow cases, and the locations where they have the possibility to form the dry spots are identified. The flowchart of FIG. 1 outlines an alcohol pre-infusion based process control for the VARTM scheme of the present invention. The auxiliary infusion gates are positioned at the designed locations. Due to the flow similarity between alcohol and resin, the alcohol is infused before the actual resin infusion to locate potential dry spots. Once the potential locations of dry spots are detected, the auxiliary gate is ready to open during the actual resin flow.

An initial component of the approach can include VARTM flow simulation. Previously, the existing RTM flow simulation code had been modified with auxiliary permeability and compaction models to solve the VARTM flow problem. It was found there that the approximation agreed with experimental data. A similar method is adopted here.

An RTM flow simulation code, known as RTMSim, was modified according to the time-dependent permeability values to approximate the VARTM flow advancement. In the method 100 of FIG. 2, at the beginning of mold filling, the mold filling simulation program assumes that the control volumes enclosing the inlet nodes have already been filled with liquid (block 101). In the simulation, since the specified pressure is 14.7 psi (atmospheric pressure), the pressure at every liquid inlet node is equal to the specified value.

In the RTMSim software, after the pressure field is determined for the inlet nodes. the corresponding velocity field can be determined according to Darcy's law with initial boundary conditions, including permeability, porosity, and volume fraction (block 102). For a selected time increment, the volume of resin flowing into each flow front control volume ($0<f<1$) is calculated based on the velocity field (block 103). The calculated volume of resin inflow is added to the original volume of resin in the flow front control volume (block 104). If the total resin volume in a control volume is equal to the volume of the control volume, that control volume is considered "full" ($f=1$). If the total resin volume in a control volume is less than the volume of the control volume, f is calculated as the volume fraction of the resin in the control volume (block 105). After the value f is updated, a boundary conditions update is performed (block 106). The volume fraction, porosity and permeability values are updated based on the auxiliary compaction models. The procedure is repeated until the whole mold is filled (block 107). The predicted final pressure profile, flow progress as well as thickness distribution are output and displayed.

The nominal permeability values were generated by a Monte Carlo simulation. Two statistical models, including Weibull and normal distributions, were utilized to describe the race-tracking and average permeability values, respectively. With statistically distributed permeability values, the most possible flow patterns are investigated. After analyzing those flow patterns, the locations of auxiliary infusion gates can be identified, and the auxiliary gates can be ready to open during the actual resin infusion. The alcohol pre-infusion, an important feature of the present invention, determines which auxiliary gate is open and when it is open.

The chemical properties of the alcohol are significantly different from those of the resin. Therefore, the first step of the study is to validate the flow similarity between alcohol flow and resin flow. Then the mechanical properties testing are conducted to verify that the alcohol pre-infused parts are not damaged in terms of chemical bonding and interfacial properties. This study was found to be valid, which led to a more complex case study to show the capability of the present approach.

Ethyl alcohol with a viscosity about 1.2 cp (AAPER Alcohol and Chemical Co.) was used as the test liquid at room temperature. This material was selected because it is nontoxic and easy to remove under heat after the infusion. Other types of liquid may also be used, and this is not intended as a limitation on the invention. Preferably, however, a liquid is used that is easily removed from the mold after pre-infusion is performed. Four types of fiber were used: COFAB knitted glass fiber S2 fiber glass cloth (CollinsCraft Composites Corporation), twilled S2 fiberglass (Owens Corning, Inc.), 1M7 carbon fiber (Hexcel Corporation), and T650-35 carbon fiber (Fabric Development, Inc.). The resin includes unsaturated polyester resin (Cook Composites and Polymers Co.), epon 862 (Resolution Performance Products, LLC), and vinyl ester (Fibre Glast Developments Corporation). The curing agent for the polyester resin is organic peroxide (Atofina Chemicals), and the curing agent for epon 862 is Epi-w (Resolution Performance Products, LLC).

After the fibers are laid-up and enclosed in the vacuum bag, test liquid or resin is injected into the vacuum bag through different tubes. For the test liquid tube, the outer diameter is 1 mm, the inner diameter is 0.5 mm; for the resin tube, the outer diameter is 5 mm, and the inner diameter is 3.5 mm. The flow patterns are recorded by a digital camcorder on top of the VARTM bag assembly. Leakage, race-tracking, or dry spots can all be predicted by the test liquid flow pattern. The resin injection strategy is designed based on the flow pattern of the test liquid. Auxiliary inlet or vent locations can be used to adjust the local permeability. Then the test liquid is removed through vacuum and moderate heating of the mold or hot air blower. The resin cannot be injected until all the test liquid is removed by heat. The resin flows in and easily achieves adequate fiber wet-out. The resin is cured under vacuum before the product is removed.

The test liquid pre-infusion control experiments were conducted for different reinforcement or lay-up structure and were compared with conventional resin infusion without the test liquid infusion.

The flow fronts of the test liquid flow approximate the actual resin flow front, except that the test liquid is a little more sensitive to the pressure change. Other lay-up structures, and other injection or vent locations, were also selected, and it is verified that the test liquid has a similar flow front to resin in all these cases. The resultant fiber volume percentages were also found to be very close.

Figure 3A:
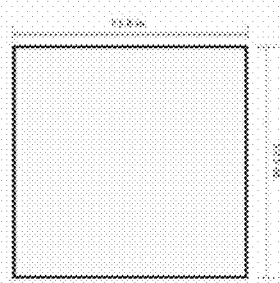
FIGS. 3A,3B illustrate a 1M7 carbon fiber (FIG. 3A) and a vacuum bag assembly (FIG. 3B) for Case 1.
Figure 3B:
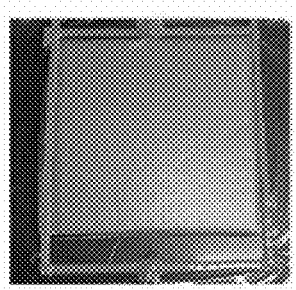
Figure 4A:
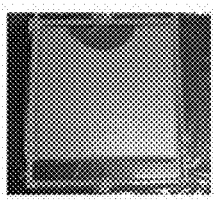
FIGS. 4A-4J illustrate the VARTM flow pattern for Case 1. Step 1 (FIGS. 4A-4F): alcohol flow; Step 2 (FIGS. 4G-4J): polyester flow after removal of alcohol.
Figure 4B:
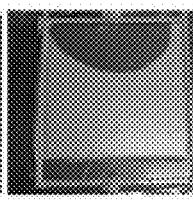
Figure 4C:
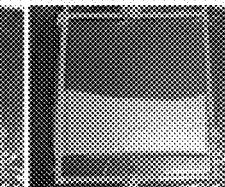
Figure 4D:
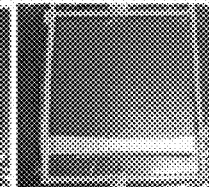
Figure 4E:
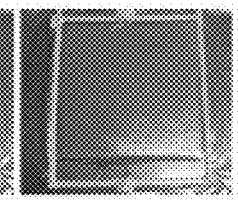
Figure 4F:
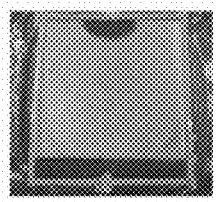
Figure 4G:
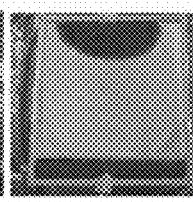
Figure 4H:
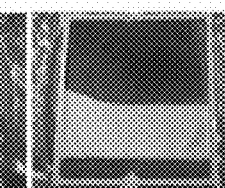
Figure 4I:
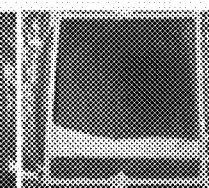
Figure 4J:
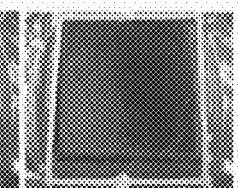
Figure 5A:
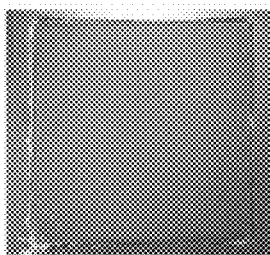
FIGS. 5A,5B illustrate composite panels for Case 1 with alcohol pre-infusion (FIG. 5A) and without resin infusion (FIG. 5B).
Figure 5B:
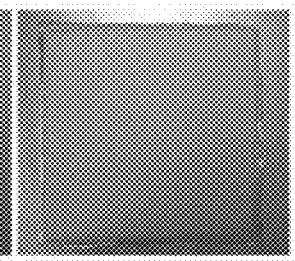
Figure 9A:
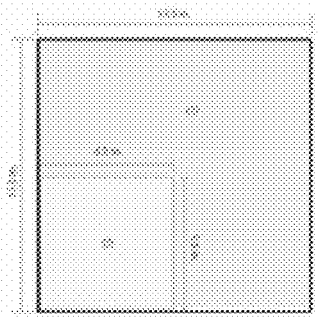
FIGS. 9A,9B illustrate a COFAB knitted S2 fiber glass of five layers (1) and T650-35 carbon fiber with six layers (2) (FIG. 9A) and a vacuum bag assembly (FIG. 9B) for Case 3.
Figure 9B:
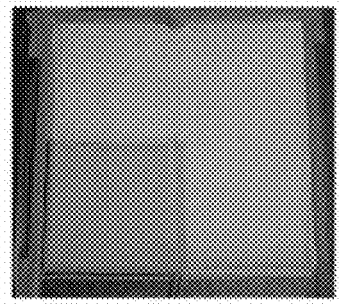
Figures 10A, 10B, 10C, 10D, 10E:
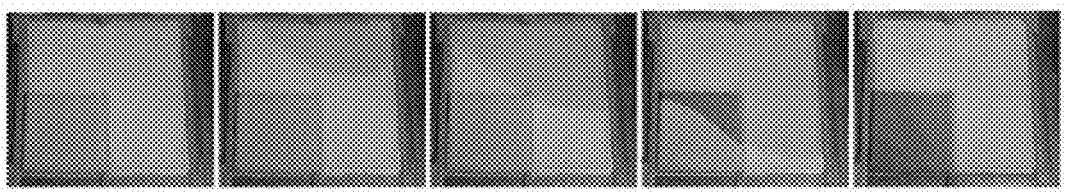
FIGS. 10A-10J illustrate the VARTM flow pattern for Case 3. Step 1 (FIGS. 10A-10F): alcohol flow; Step 2 (FIGS. 10G-10J): polyester flow after removal of alcohol.
Figures 10F, 10G, 10H, 10I, 10J:
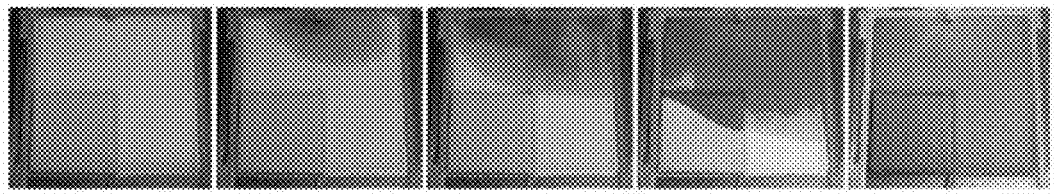
Figures 11A, 11B:
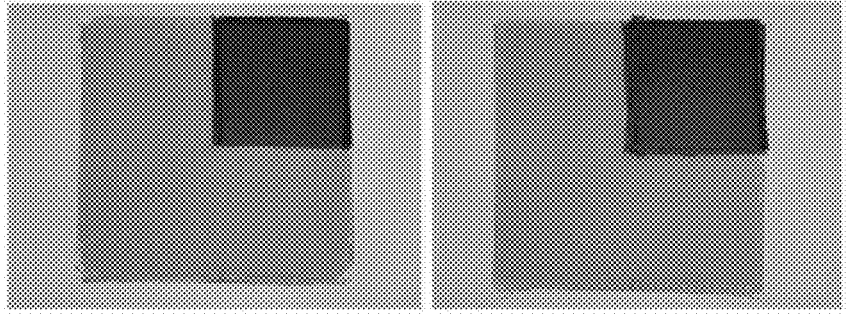
FIGS. 11A,11B illustrate composite panels for Case 3 with alcohol pre-infusion (FIG. 11A) and without resin infusion (FIG. 11B).
Figure 12:
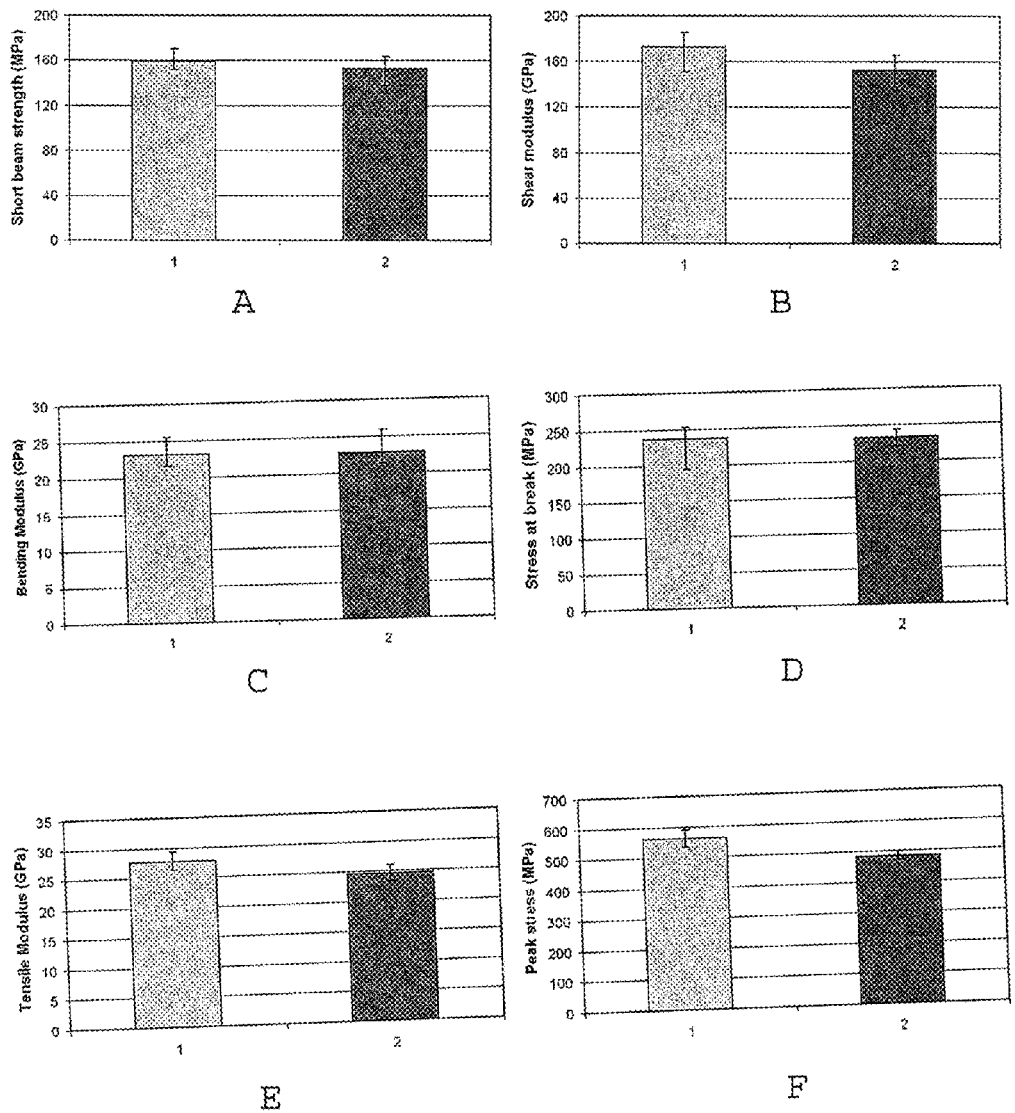
FIGS. 12A,12B are short-beam test results for HWR-240 glass fiber/polyester composites, including short-beam strength (FIG. 12A) and shear modulus (FIG. 12B) with (1) and without (2) alcohol pre-infusion.
FIGS. 12C,12D are three-point bending results for HWR-240 glass fiber/polyester composites, including bending modulus (FIG. 12C) and stress at break (FIG. 12D) with (1) and without (2) alcohol pre-infusion.
FIGS. 12E,12F are tensile strength results for HWR-240 glass fiber/polyester composites, including tensile modulus (FIG. 12E) and peak stress (FIG. 12F) with (1) and without (2) alcohol pre-infusion.

Different dimensions and permeability distributions and diverse material distributions were designed (FIGS. 3A,3B; 6A,6B; and 9A,9B). It has been found that ethyl alcohol can be used to predict the flow pattern. The corresponding experimental phenomenon is illustrated in FIGS. 4A-4J, 7A-7J, and 10A-10J. As the flow front of alcohol is more sensitive to pressure change in a vacuum bag than the polyester resin, flow channels should be carefully selected to keep the alcohol flow pattern matching that of the resin flow. The alcohol pre-infusion method is found to be effective to detect fiber preform quality-induced flow problems for VARTM process design and flow control purposes. In order to attest that alcohol does not harm the fundamental fiber-sizing surface thermodynamics and fiber-resin interfacial bonding, comparative composite panels without alcohol infusion were also made (FIGS. 5A,5B; 8A,8B; and 11A,11B). The following experiments focused on mechanical and microstructure properties comparisons between conventional composite and composite with the aid of the alcohol control method.

Since the approach of the present invention requires that the test liquid be infused before the resin infusion to identify the potential flow defects, experiments were performed to determine whether the test liquid had an effect on the final part properties, which included mechanical properties tests, microscopy properties tests, and thermal properties tests in order to obtain a complete view of how the test liquid pre-infusion affects the final part properties.

Since the nature of the interface is a major factor affecting the physical and mechanical properties of composites, the control of interfacial properties is of considerable significance. During the production of glass fibers, the fibers are protected against fiber fracture and fuzz formation by a polymeric coating, referred to as the "sizing," which can also serve as an agent for changing the degree of adhesion at interfaces between fibers and matrix, producing the resulting final mechanical properties of the composites. There exists the possibility that the test liquid could damage the sizing surface; so a series of mechanical and thermal tests were conducted to investigate the influence of the test liquid ethyl alcohol, and 5-10 specimens were prepared for each panel.

The short-beam and three-point bending tests were conducted on a MTS tensile tester. The dynamic mechanical properties were tested on a DMA 2980 dynamic mechanical analyzer in three-point bending mode. An optical microscope (Zeiss Corporation) and a field emission scanning electron microscope (SEM; JOEL JSM-6400F) was used to analyze the microstructure with and without alcohol pre-infusion. A Nicolet Nexus Fourier transform infrared microscopy (FTIR) microscope was also used to analyze the congredients in the composite specimens. A thermal mechanical analysis (TMA) apparatus (TMA 2940) and a thermal gravimetric analysis (TGA) apparatus (TGA Q50) are both from TA Instrument, Inc.

It is known that the mechanical properties of composites depend strongly on the adhesion between the fiber and the matrix. It has been shown that different sizings may improve interfacial properties, but if the sizing is not compatible with the matrix, there is de-cohesion at the sizing/matrix interface. Here it may be possible that a little alcohol remnant exists among the fiber tows or that the heat removal process could influence the sizing effect in fiber-matrix adhesion. Therefore, the short-beam and three-point bending tests were carried out to check the interfacial properties. According to ASTM D2344/D 2344M, for a rectangular cross section of the composites sample, the short-beam strength was calculated as follows:

$$F_{sbs} = 0.75 \times \frac{P_m}{b \times h}$$

where $F_{sbs}$ is the short-beam strength, MPa (psi); $P_m$, the maximum load observed during the test, N (lbf); b, the measured specimen width, mm (in.); and h, the measured specimen thickness, mm (in.).

The loading rollers cause indentation deformation and a concentration of compressive and transverse shear stresses. These stresses, either individually or in combination, exceed the material strength before inter-laminar failure occurs. The waviness of textile fabric composites further deteriorates the compression strength and causes compression failure on the loading side. FIGS. 12A and 12B show the results of short-beam strength and shear modulus of the composites with and without alcohol pre-infusion on COFAB knitted S2 glass fiber as an example, which are equal within experimental error. Table 1 lists the short-beam test results for the same material.

TABLE 1

Short-Beam Test Results of COFAB Knitted S2 Glass Fiber/Polyester Composites

| | Sample | Shear Modulus (GPa) | Peak Load (N) | UTS Peak Stress (MPa) | Short Beam Strength (%) | Average Shear Modulus (GPa) | Average Short Beam Strength (MPa) |
|---|---|---|---|---|---|---|---|
| With alcohol pre-infusion | A1 | 15.021 | 551.78 | 201.48 | 151.11 | 17.31 | 159.15 |
| | A2 | 18.496 | 593.83 | 216.08 | 162.06 | | |
| | A3 | 16.926 | 626.44 | 223.55 | 167.66 | | |
| | A4 | 17.530 | 658.15 | 214.07 | 160.69 | | |
| | A5 | 18.558 | 574.46 | 205.83 | 154.37 | | |
| | A6 | 17.332 | 645.79 | 211.53 | 159.01 | | |
| Without alcohol pre-infusion | B1 | 14.481 | 811.57 | 222.62 | 166.97 | 15.27 | 151.98 |
| | B2 | 13.834 | 687.20 | 180.83 | 135.62 | | |
| | B3 | 15.526 | 705.83 | 196.81 | 147.61 | | |
| | B4 | 14.392 | 708.77 | 189.67 | 142.25 | | |
| | B5 | 15.017 | 611.59 | 181.01 | 135.76 | | |
| | B6 | 18.349 | 673.73 | 244.90 | 183.68 | | |

In addition, the three-point bending and tensile tests of the composite with and without alcohol pre-infusion also yield similar values (FIGS. 12C-12F). FIGS. 12C and 12D) plot three-point bending test results of HWR-240 glass fiber/polyester composites, with FIG. 12C illustrating bending modulus and FIG. 12D illustrating stress at break. FIGS. 12E and 12F plot tensile test results of HWR-240 glass fiber/polyester composites, with FIG. 12E illustrating tensile modulus and FIG. 12F illustrating peak stress.

Experiments on the composites of other fiber and resin types also show that alcohol has possibly been removed successfully before resin infusion, and the remnant has no or very little effect on the interfaces of the composite systems. It is commonly considered that the elastic modulus is greatly dominated by the fibers. As a result, tensile strength and elastic modulus were not sensitive to the test liquid remnant. These mechanical tests proved that the alcohol remnant would not influence the mechanical properties of the composite system if the test liquid is removed successfully.

Figure 13:
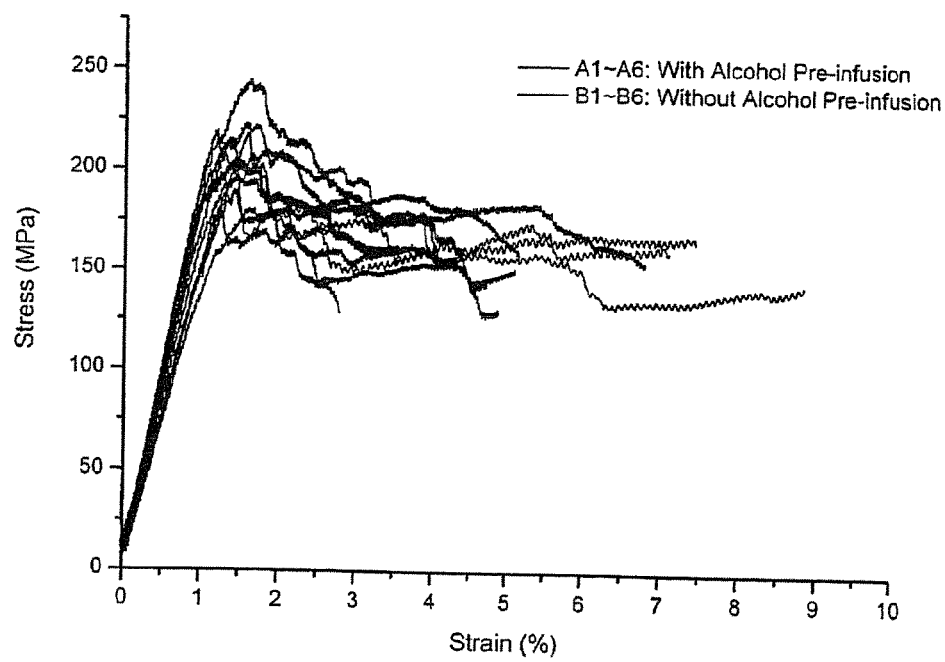
FIG. 13 is a plot of short-beam experiment results, with and without alcohol pre-infusion.

FIG. 13 shows the shear strength of the composites made with or without alcohol pre-infusion on the fibers. The polyester and epoxy-sizing agents dissolve into the matrix, allowing the silane-covered glass-fiber surface to interact with the matrix. Interaction between the fiber surface and matrix is due to an organic functional group that can interact with the double bond of the unsaturated polyester. Thus the low short-beam strength reveals an inadequate fiber-matrix interaction. The experiments on the composites of other fiber and resin types also showed that most alcohol has been removed away successfully before resin infusion, and the remnant has no or very little affect on the interfaces of the composite systems.

In addition, the flexural strengths and moduli of the composite with and without alcohol pre-infusion also have similar values, as shown in Table 2. It is commonly considered that the elastic modulus is greatly dominated by the fibers. As a result, tensile strengths and elastic moduli were not sensitive to the test liquid remnant, as shown in Table 3. All these mechanical tests proved that an alcohol remnant does not influence the mechanical properties of the composite system if the test liquid can be removed successfully.

TABLE 2

Three-Point Bending Test Results for COFAB Knitted S2 Glass Fiber Composite

| | Sample | Bending Modulus (GPa) | Peak Load (N) | Stress at Break (MPa) | Strain at Break (%) | Average Bending Modulus (GPa) | Average Stress at Break (MPa) |
|---|---|---|---|---|---|---|---|
| With alcohol pre-infusion | A1 | 21.524 | 325.851 | 252.794 | 1.22 | 23.11 | 236.67 |
| | A2 | 21.688 | 262.176 | 193.931 | 1.59 | | |
| | A3 | 25.473 | 293.799 | 251.328 | 1.10 | | |
| | A4 | 23.600 | 284.472 | 240.998 | 1.10 | | |
| | A5 | 23.283 | 284.797 | 244.305 | 1.14 | | |
| Without alcohol pre-infusion | B1 | 21.210 | 295.643 | 232.147 | 1.72 | 22.70 | 232.27 |
| | B2 | 22.096 | 260.411 | 220.330 | 1.12 | | |
| | B3 | 22.792 | 287.639 | 243.033 | 1.16 | | |
| | B4 | 21.540 | 269.960 | 235.720 | 1.45 | | |
| | B5 | 25.841 | 250.594 | 230.120 | 1.30 | | |

TABLE 3

Tensile Test Results of COFAB Knitted Glass Fiber Composite

|  | Sample | Tensile Modulus (GPa) | Tensile Strength (MPa) | Average Tensile Modulus (GPa) | Average Peak Stress (MPa) |
|---|---|---|---|---|---|
| With alcohol pre-infusion | A1 | 27.758 | 560.43 | 27.723 | 562.266 |
|  | A2 | 27.250 | 574.15 |  |  |
|  | A3 | 27.233 | 514.85 |  |  |
|  | A4 | 28.333 | 608.52 |  |  |
|  | A5 | 28.042 | 553.38 |  |  |
| Without alcohol pre-infusion | B1 | 24.458 | 487.02 | 24.630 | 483.678 |
|  | B2 | 24.749 | 480.19 |  |  |
|  | B3 | 24.468 | 482.54 |  |  |
|  | B4 | 25.067 | 498.40 |  |  |
|  | B5 | 24.407 | 470.24 |  |  |

Figure 14:
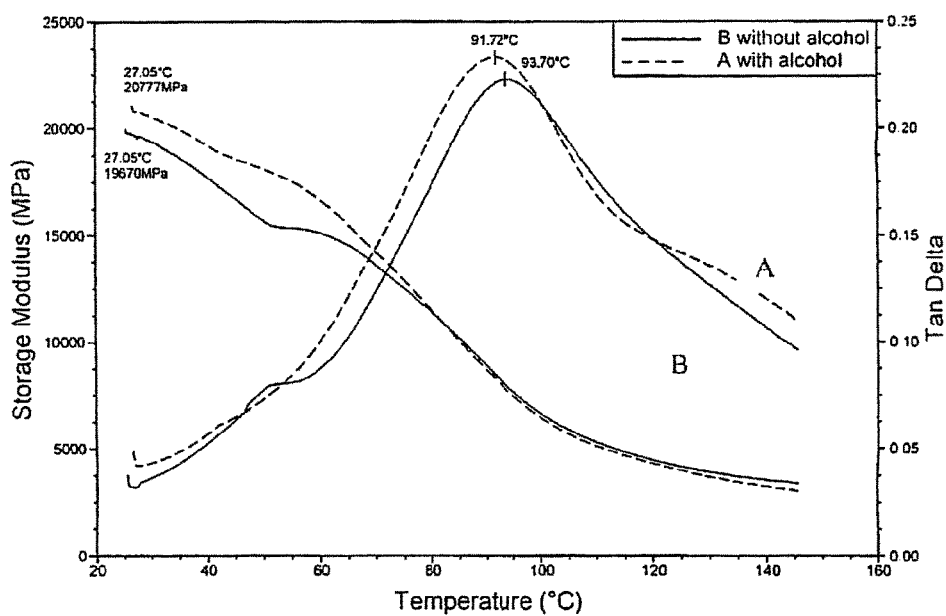
FIG. 14 plots the DMA of COFAB knitted glass fiber/polyester composite, with (curve A) and without (curve B) alcohol pre-infusion, at two different sets of experimental conditions.
Figure 17:
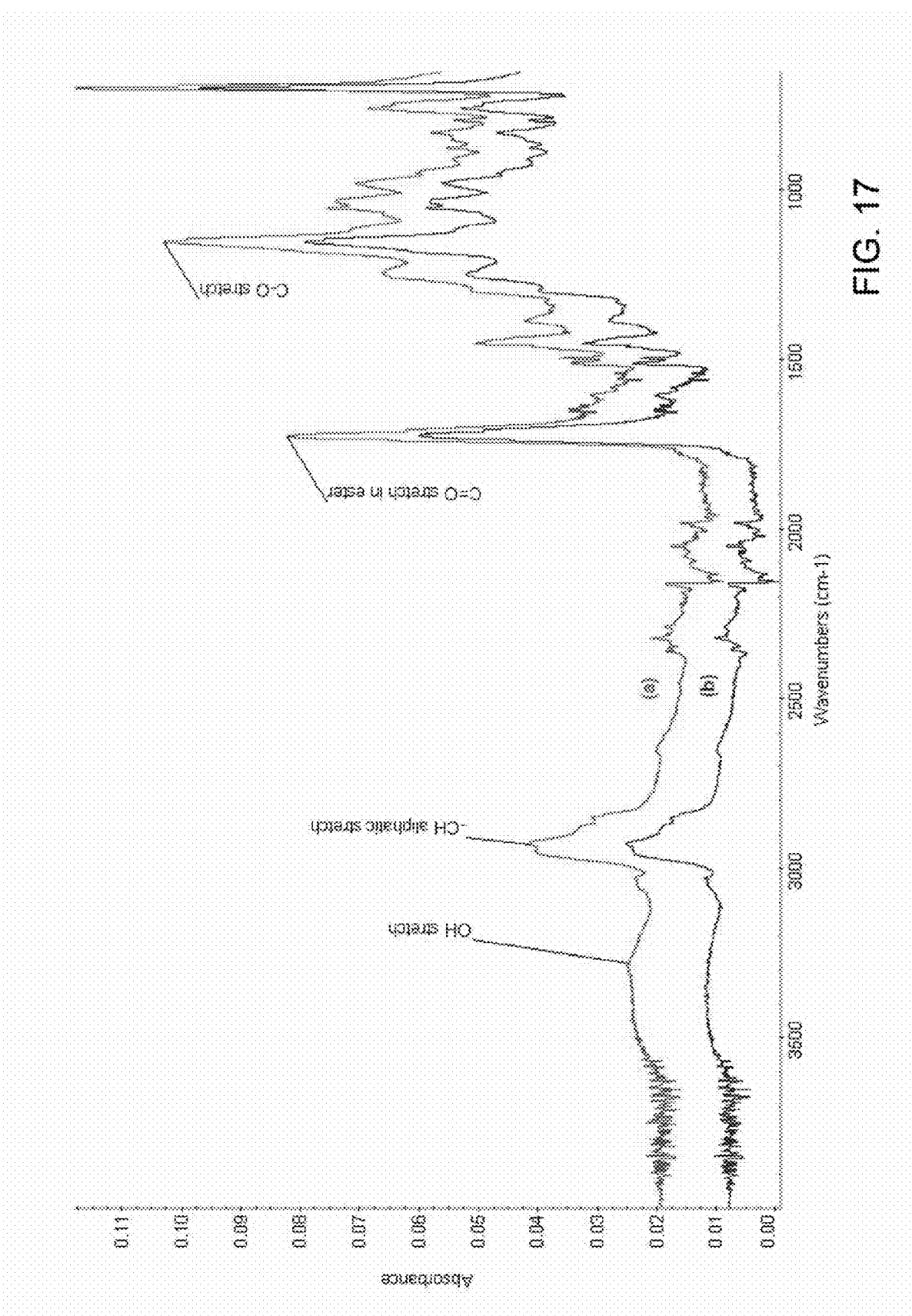
FIG. 17 plots FTIR spectra of COFAB knitted glass fiber/polyester composite after 2 h (a) and after 1 h (b).

Taking into account the temperature, the COFAB knitted glass fiber/polyester composites were tested with a dynamic mechanical analyzer (DMA) (FIG. 14). The storage modulus and loss coefficient of the composites with and without alcohol test liquid control were investigated. Here, the specimens were tested along the fiber direction. The main relaxation (a-relaxation) as the damping of tan θ is listed, which correlates with the glass transition. The glass transition temperatures of the two composites are 91.72° C. and 93.70° C., respectively. DMA tests proved that alcohol pre-infusion has little or no adverse effects on composite properties such as $T_g$ and storage modulus for polyester and vinyl ester resin. However, a decrease of $T_g$ was found after alcohol pre-infusion for epoxy resin-based composites.

The most commonly used sizings of glass fibers are polyvinyl alcohol (PVA), polyester, and epoxy resins, which improve the mechanical interfacial properties of fibers in the unsaturated polyester matrix. The fracture surfaces of representative COFAB knitted glass fiber/polyester composites specimens were examined by optical and SEM, and optical micrographs of these fracture surfaces are shown in FIGS. 15A and 15B. Some sizing encased the surface of the fibers and improved interfacial adhesion. The fracture surfaces show no obvious differences.

In failure analysis, scanning electron microscopy (SEM) provides much higher magnification. unique imaging. and the opportunity to perform elemental analysis and phase identification. The SEM micrographs further validated the result (FIGS. 16A-16D). The fracture surface topography along both the transect of the fiber and the fiber directions illustrated that the glass fibers were stripped of some matrix material and reconfirmed the evidence of a similar degree of fiber-matrix adhesion, causing a similar failure path in a resin matrix.

FTIR was used to characterize and identify chemical bonds and the molecular structure of organic compounds. The hydroxyl bond content change in the composites was investigated (FIG. 17), which showed the wave numbers of the peaks with their corresponding functional groups and vibration types. In the hydroxyl bond-stretching region (3480-3440 $cm^{-1}$), no obvious differences existed between the composites. The shapes and locations of all the functional group spectra are almost same; thus the heat flow removed almost all the alcohol successfully. The FTIR spectra of other fiber/resin composites were also investigated, with the same results.

Figure 18:
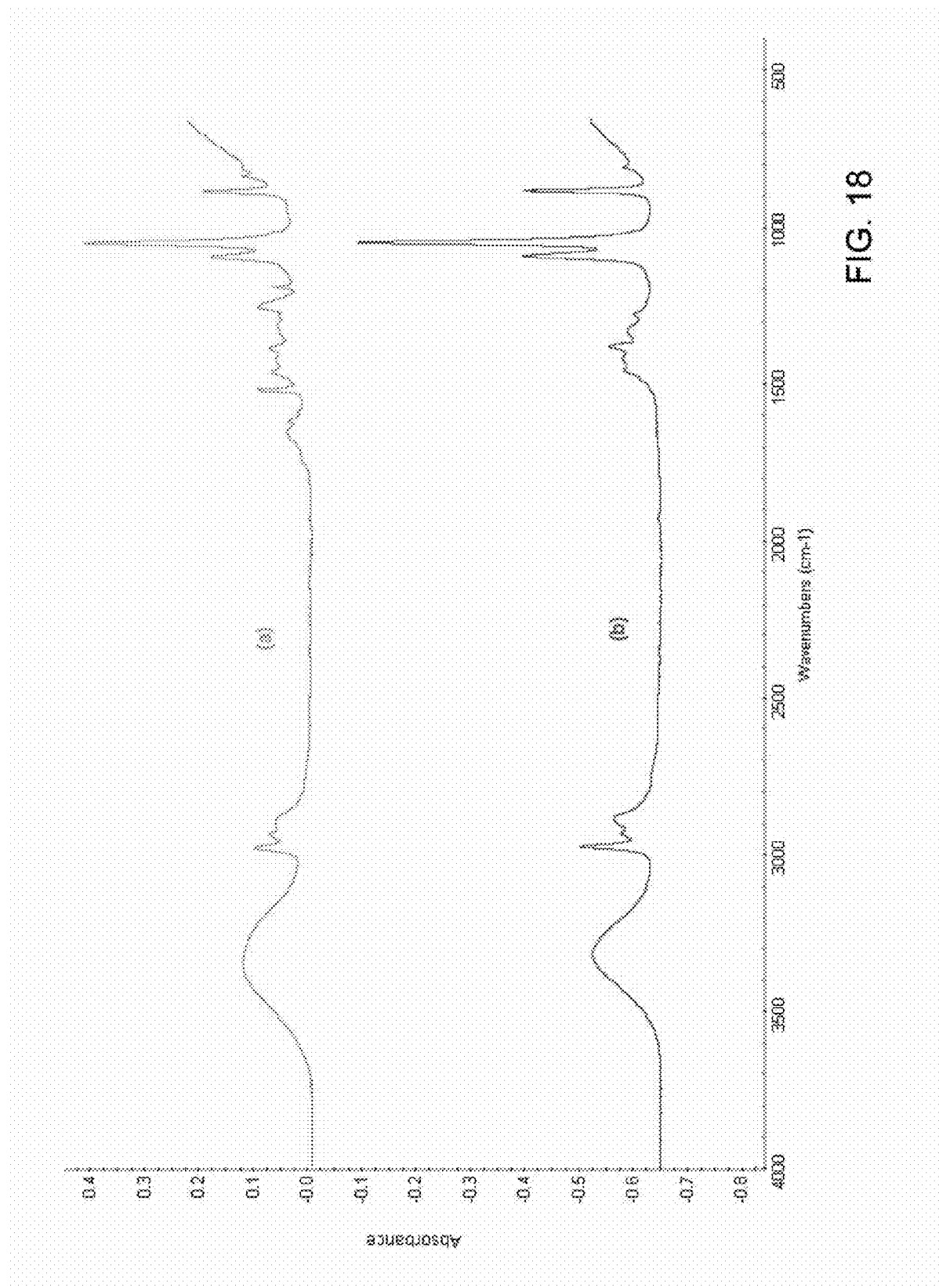
FIG. 18 plots FTIR spectra of flow-out alcohol residuals following evaporation after 2 h (a) and after 1 h (b).
Figure 19:
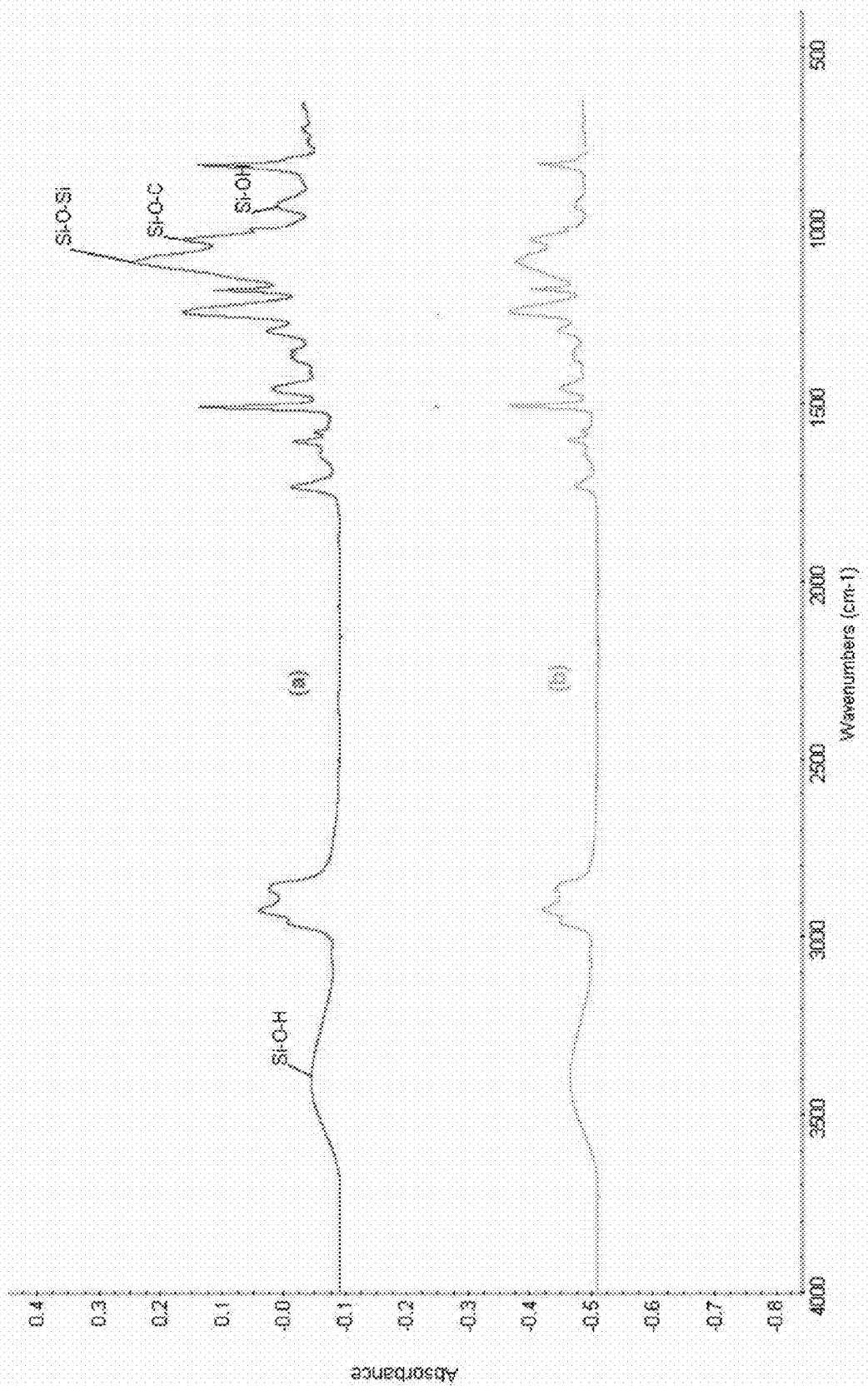
FIG. 19 plots FTIR spectra of flow-in alcohol residuals following evaporation after 2 h (a) and after 1 h (b).

In addition, the residual constituents between flow-in alcohol and flow-out alcohol after pre-infusion were compared (FIGS. 18 and 19). It is reasonable that the flow-out pre-infused alcohol carried away some sizing and impurity from the silane-covered glass fiber; so its residual content is different from the flow-in neat alcohol. In the silicon-hydroxyl region (3500-3100 $cm^{-1}$), a peak formed at 3300 $cm^{-1}$. In the region 800-1500 $cm^{-1}$, a sharp peak exists at 1100 $cm^{-1}$ with a shoulder peak at 1050 $cm^{-1}$ corresponding to Si—O—Si and Si—O—C groups. The FTIR of flow-in alcohol residuals is listed as a comparison.

Summarizing the FTIR spectra results, it is believed that the pre-infusion procedure washed out very little impurity and sizing so that it did not obviously affect the fiber/matrix interface. Therefore, pre-infusion has no or very little influence on the properties of the composites.

Figure 20A:
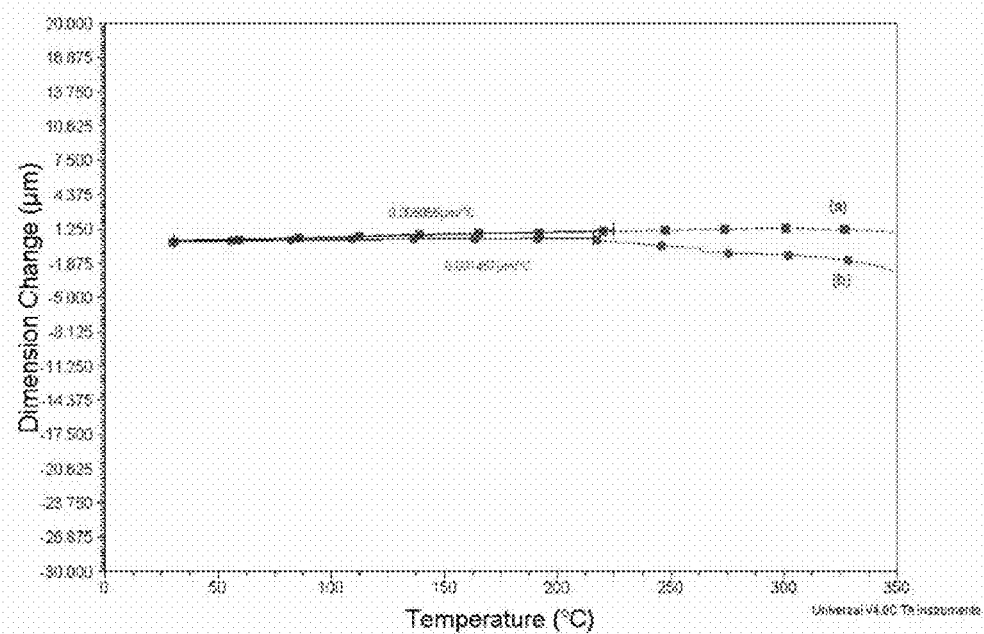
FIG. 20A plots TMA of 1M7 carbon fiber/polyester composites with (a) and without (b) pre-infused alcohol.

In order to obtain thermal expansion coefficients of the composites, ten samples were machined and tested by TMA 2940 (FIG. 20A). The heating ramps from 25 to 350° C. with a heating rate of 10° C./min, resulting in an expansion of the specimen detected by a quartz probe with a precision of one micrometer. For the carbon materials, the CTE is almost zero, being 0.001457 μm/° C. and 0.005055 Δm/° C., respectively. That is to say, the dimensions changed very little, even up to 350° C.

Figure 20B:
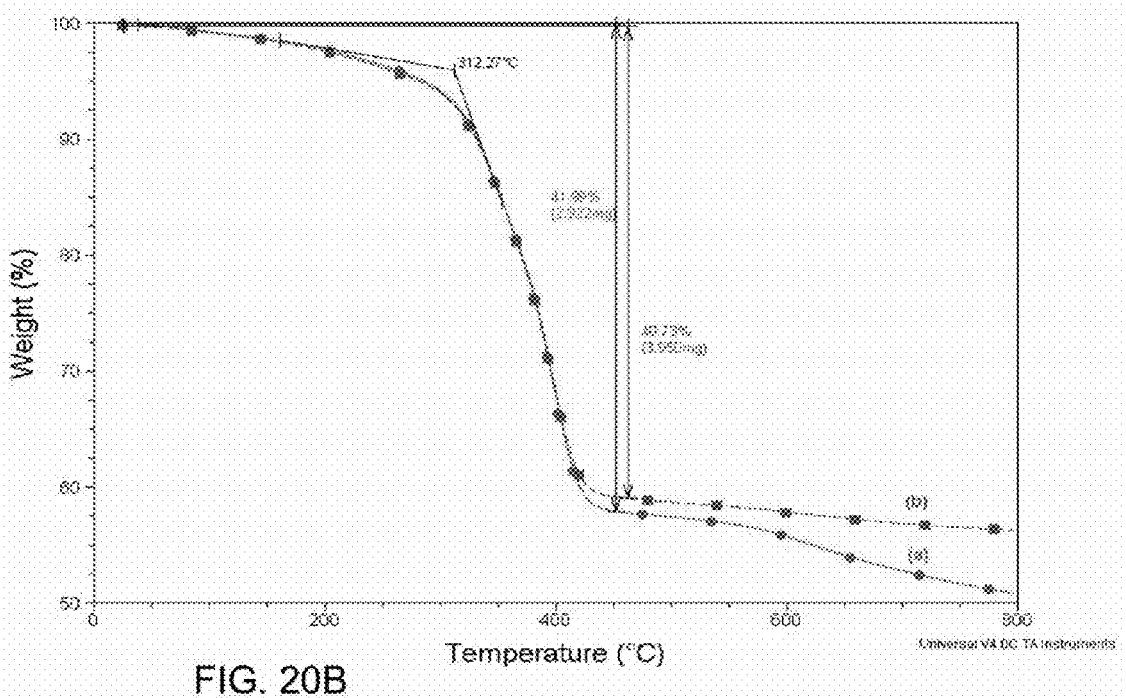
FIG. 20B plots TGA profiles of 1M7 carbon fiber/polyester composites in nitrogen with (a) and without (b) pre-infused alcohol.

Thermogravimetric analysis was performed in a nitrogen environment to investigate the amount of the remnant alcohol in composites. FIG. 20B shows the variation of weight as a function of temperature. It can be seen that there is no significant weight loss below 300° C., implying that the alcohol has been successfully removed by the hot wind. When the temperature rises to about 400° C., the composite with alcohol pre-infusion exhibits more weight loss, possibly due to an inadequate curing reaction. It is obvious that almost no alcohol exists in the composites.

Figure 21A:
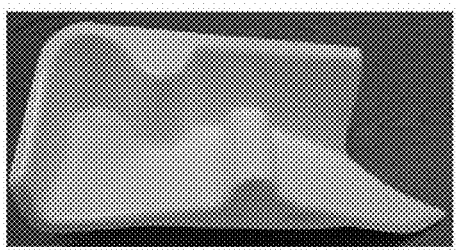
FIGS. 21A,21B depict an actual part (FIG. 21A) and an FEM model (FIG. 21B) of meshed geometry with varying permeability of a boat part.
Figure 21B:
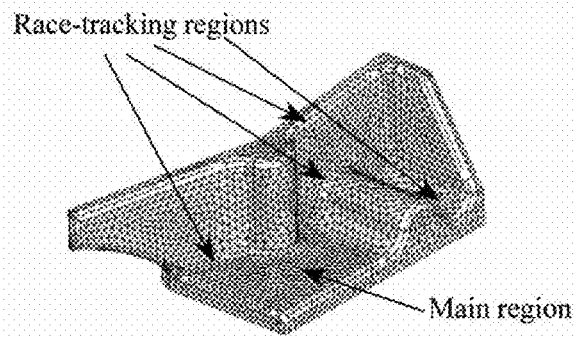

A more complex part for a boat deck was designed (FIG. 21A). The race-tracking distribution is shown in FIG. 21B, which was along the edge of the part and sharp corners. Therefore, the average permeability values were assumed to be statistically distributed as normal random variables, and the race-tracking effects could be statistically characterized as Weibull variables.

Figure 22:
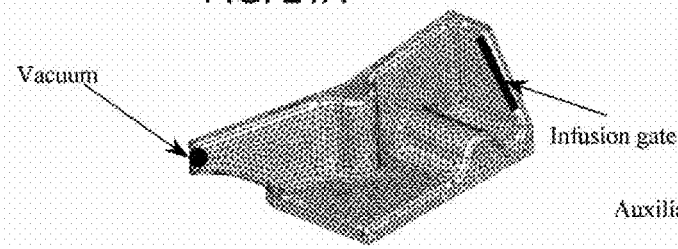
FIG. 22 illustrates a primary tooling design.

The concept of simulation before production has been utilized in almost every field of industry. However, in the realm of VARTM processes, the process parameter uncertainty impedes the broader application of simulation to real production. To avoid dry spots that are formed by trapped air bubbles while resin saturating the preform, the vents should be positioned at locations where the flow ends to entrap the air so as to ensure consistent part quality and maintain a successful rate. In fabricating a batch of a specific part, the permeability variations and the variations of the race-tracking effect of the fiber preforms make the ending locations of the flow diverse. Because of the uncertain process parameters, the flow does not end where desired. Therefore, the strategy of utilizing the simulation program should be investigated to resolve the problems discussed above. Previously the inventors have addressed the issue of the stochastic aspect of composite manufacturing processes and proposed guidelines for stochastic simulation procedures. After extensive simulation studies, by using the dispersion value approach, it was concluded that for a part with a relatively complex geometry, simulation runs between 20 and 30 could serve as a safe lower bound to obtain convergence. Therefore, in this study, an average value of 25 was adopted as the number of cases for the database. FIG. 22 shows a primary tooling design with one vacuum point and a line infusion gate.

With the primary tooling design and the assumed statistically distributed permeability values, a case database was constructed. FIGS. 23A-23F show flow advancement predictions of the detailed cases in the database. The database represents all the scenarios, including the worst and the best cases. To compensate for flow defects and avoid dry spot formation, each case should have a unique number and locations of auxiliary gates. The proposed pre-infusion approach is to (1) identify potential locations for auxiliary infusion gates; (2) infuse alcohol to determine dry spot locations and auxiliary gate control; and (3) infuse an actual resin with the auxiliary gate control strategy obtained from step (2). In this way, dry spot formation can be reduced dramatically, which results in consistent part quality.

Figure 24:
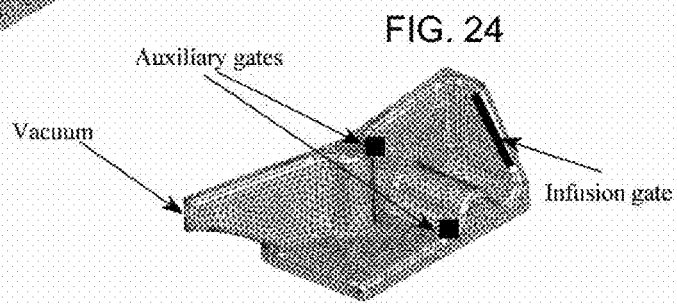
FIG. 24 illustrates a primary tooling design.
Figure 23A:
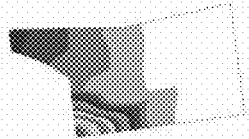
FIGS. 23A-23F show flow advancement predictions of detailed cases in the database.
Figure 23B:
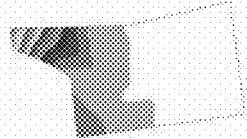
Figure 23C:
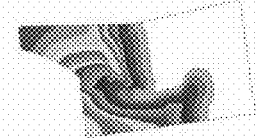
Figure 23D:
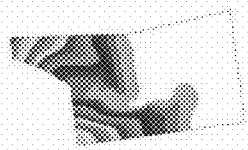
Figure 23E:
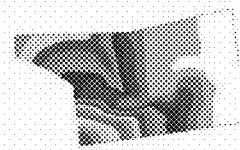
Figure 23F:
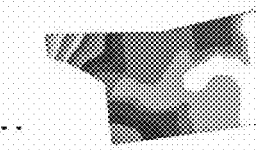
Figure 25A:
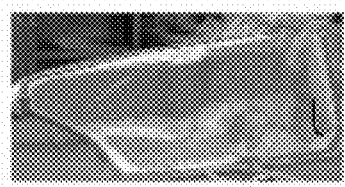
FIGS. 25A-25F depict the flow advancement process of an alcohol infusion experiment.
Figure 25B:
Figure 25C:
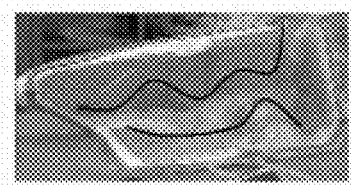
Figure 25D:
Figure 25E:
Figure 25F:
Figure 26A:
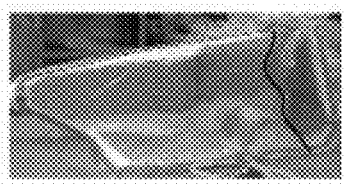
FIGS. 26A-26F depict a resin infusion experiment after alcohol pre-infusion.
Figure 26B:
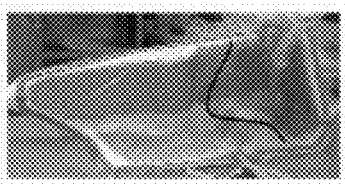
Figure 26C:
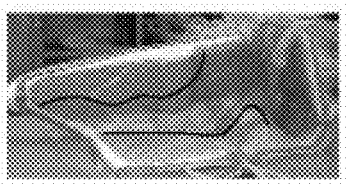
Figure 26D:
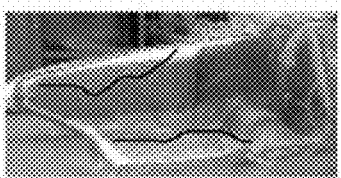
Figure 26E:
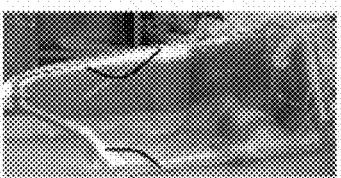
Figure 26F:
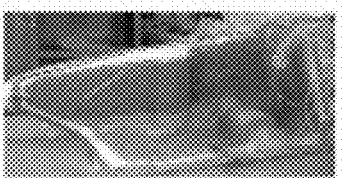

After examining each case, the locations where dry spots are most likely to form are identified, and two auxiliary gates are needed to assure dry spot compensation (FIG. 24).

FIGS. 25A-25F show the flow advancement process of the alcohol infusion experiment. Race-tracking occurred severely at all the edges and corners, and a dry spot was formed at the lower corner of the part. Therefore, it is imperative to open the auxiliary infusion gate located at the bottom of the part once the primary flow passes the gate. The resin from the auxiliary gate should be able to eliminate dry spot formation.

FIGS. 26A-26F show the resin infusion experiment after alcohol pre-infusion was conducted and the process control strategy was determined. The resin flowed with a similar pattern as that of the alcohol. The auxiliary gate at the bottom was opened when the resin passed the gate. A dry spot formed in the alcohol flow did not occur in the resin flow. The preform was saturated with resin completely, indicating the effectiveness of the approach.

An innovative approach is presented to detect fiber preform quality-induced flow problems in VARTM with a removable test liquid. Substantive experimental results suggest that the test liquid can successfully predict potential problems in the actual manufacturing process, and that the slight impact on the fiber-resin interface can be neglected. The final composites are proved to have comparable mechanical, thermal, and microstructure properties. The conclusions can be drawn as follows: Alcohol can be used as a test liquid to detect preform quality for flow control purposes; the flow front of alcohol matches that of the polyester resin well. The resin volume fractions between the composites with alcohol pre-infusion and without alcohol pre-infusion had no significant difference. Test liquid pre-infusion was shown to have no or little effect on composite properties. The short-beam, three-point bending, and tensile tests showed no obvious influence on the interfacial properties by the pre-infusion. DMA tests proved that alcohol pre-infusion has little or no adverse effects on composite properties including $T_g$ and storage modulus; TMA tests showed similar dimensional stability between the two types of composites; and TGA tests revealed almost all the alcohol has been removed from the composites by heat. FT-IR microscopy analysis results revealed no or little obvious alcohol residuals in the final composite: SEM results indicated no significant difference between the fracture surfaces of composites with and without alcohol pre-infusion.

The alcohol pre-infusion method is effective for VARTM process design and flow control purposes. This method is more cost effective and easier to implement than previous online control methods using sensors, and can be implemented for real-time flow control to achieve void-free resin filling and complete preform saturation.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the method and system illustrated and described herein are by way of example, and the scope of the invention is not limited to the exact details of construction or use.

Having now described the invention, the construction, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A method of tracking a flow process in vacuum-assisted resin transfer molding for assisting in process design and for ensuring molded part quality, the method comprising the steps of:
   pre-infusing a vacuum-assisted resin transfer mold with a liquid, the mold having an auxiliary infusion gate therein in spaced relation from a primary infusion gate;
   detecting a sequence of the mold pre-infusion step;
   determining from the detected sequence a location of flow inhomogeneity adjacent the auxiliary infusion gate; and
   creating a resin infusion sequence based on the determined location of the flow inhomogeneity, the sequence including opening the auxiliary infusion gate and moving resin therepast.

2. The method recited in claim 1, wherein the liquid comprises alcohol.

3. The method recited in claim 2, wherein the alcohol comprises ethyl alcohol.

4. The method recited in claim 1, wherein the determined flow inhomogeneity location comprises a region determined to be susceptible to the formation of air bubbles during resin infusion.

5. The method recited in claim 1, further comprising the steps, prior to the pre-infusing step, of:
   simulating a flow pattern for the mold;
   identifying from the flow pattern simulation a potential region of fabrication inhomogeneity; and
   determining a position for the auxiliary infusion gate in the mold adjacent the identified potential region of fabrication inhomogeneity.

6. The method recited in claim 5, wherein the simulating step comprises performing a Monte Carlo simulation to generate permeability values for the mold.

7. The method recited in claim 5, wherein the simulating step comprises creating a finite-element model and creating a flow advancement prediction using the finite-element model.

8. The method recited in claim 7, wherein the identifying step comprises identifying the potential region of fabrication inhomogeneity from a flow advancement prediction.

9. The method recited in claim 1, wherein the mold is positioned within a vacuum bag, and the detecting step comprises making a video recording of the pre-infusing step.

10. The method recited in claim 9, wherein the determining step comprises analyzing the video recording to identify a region of the mold not filled by the fluid.

11. A system for tracking and correcting a flow process in vacuum-assisted resin transfer molding for assisting in process design and for ensuring molded part quality, the system comprising:
   a gate through which the mold is pre-infused with a liquid;
   a detector for detecting a sequence of the mold pre-infusion;
   a homogeneity sensor for determining from the detected sequence a flow in homogeneity adjacent an auxiliary infusion gate; and
   an infusion sequencer implementing an actual resin infusion sequence based on the determined location of the flow inhomogeneity.

12. The system recited in claim 11, wherein the liquid comprises alcohol.

13. The system recited in claim 12, wherein the alcohol comprises ethyl alcohol.

14. The system recited in claim 11, wherein the identified flow inhomogeneity comprises a region determined to be susceptible to the formation of air bubbles during resin infusion.

15. The system recited in claim 11, further comprising:
 a processor and simulation software resident thereon for simulating a flow pattern for the mold;
 an identifier program resident in the processor and effective for identifying from the flow pattern simulation a potential region of fabrication inhomogeneity; and
 a position determiner for positioning the auxiliary infusion gate in the mold adjacent the identified potential region of fabrication inhomogeneity.

16. The system recited in claim 15, wherein the processor and software resident thereon further comprise a code segment for performing a Monte Carlo simulation and for generating from the Monte Carlo simulation permeability values for the mold.

17. The system recited in claim 16, wherein the processor and software resident thereon contain code segments for creating a finite-element model and for creating a flow advancement prediction using the finite-element model.

18. The system recited in claim 17, wherein the identifier program further comprises an output device in signal communication with the processor, and the software further comprises a code segment for directing an output on the output device of a representation of the flow advancement prediction, for permitting a user determination of the location of the potential region of fabrication inhomogeneity from the output flow advancement prediction.

19. The system recited in claim 11, wherein the mold is positionable within a vacuum bag, and the detector comprises a video recorder for recording a digital image of the mold pre-infusion.

20. The system recited in claim 19, further comprising a display for viewing the digital image.

* * * * *